United States Patent
Wormald

(10) Patent No.: US 7,432,831 B2
(45) Date of Patent: Oct. 7, 2008

(54) HANDHELD ELECTRONIC DEVICE HAVING REDUCED KEYBOARD AND MULTIPLE PASSWORD ACCESS, AND ASSOCIATED METHODS

(75) Inventor: Christopher R. Wormald, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/736,385

(22) Filed: Apr. 17, 2007

(65) Prior Publication Data

US 2007/0186017 A1    Aug. 9, 2007

Related U.S. Application Data

(62) Division of application No. 11/063,121, filed on Feb. 22, 2005, now Pat. No. 7,215,258.

(51) Int. Cl.
    *H03M 11/00*      (2006.01)

(52) U.S. Cl. .................. 341/23; 713/164; 340/5.54; 340/5.85; 707/9; 704/3

(58) Field of Classification Search .................. 341/23, 341/22; 340/5.54, 5.85; 713/184; 707/9; 704/3

See application file for complete search history.

(56) References Cited

U.S. PATENT DOCUMENTS

| | | | |
|---|---|---|---|
| 4,688,020 A | 8/1987 | Kuehneman et al. | |
| 5,664,896 A * | 9/1997 | Blumberg | 400/485 |
| 5,953,541 A | 9/1999 | King et al. | |
| 6,046,731 A * | 4/2000 | Griffin et al. | 345/168 |
| 6,876,312 B2 | 4/2005 | Yu | |
| 6,885,317 B1 | 4/2005 | Gutowitz | |
| 2004/0165924 A1 | 8/2004 | Griffin | |
| 2004/0178881 A1 | 9/2004 | Otsubo et al. | |

FOREIGN PATENT DOCUMENTS

| | | |
|---|---|---|
| EP | 2003150552 | 5/2003 |
| FR | 2818399 | 12/2000 |

* cited by examiner

*Primary Examiner*—Albert K Wong
(74) *Attorney, Agent, or Firm*—Philip E. Levy; Brij K. Agarwal; Eckert Seamans Cherin & Mellott, LLC

(57) ABSTRACT

A reduced keyboard handheld electronic device and associated method that utilizes a plurality of passwords for controlling access thereto. The handheld electronic device has a non-predictive keystroke interpretation system, such as a multi-tap system. At least one of the passwords is valid and accepted when input using a keyboard of a separate electronic device, such as a PC or another handheld electronic device, and at least one of passwords is valid and accepted when input using the reduced keyboard of the handheld electronic device. In some embodiments, the keyboard of the separate electronic device is a reduced keyboard, such as a reduced QWERTY or AZERTY keyboard, and in others it is a non-reduced keyboard, such as a standard QWERTY keyboard.

16 Claims, 7 Drawing Sheets

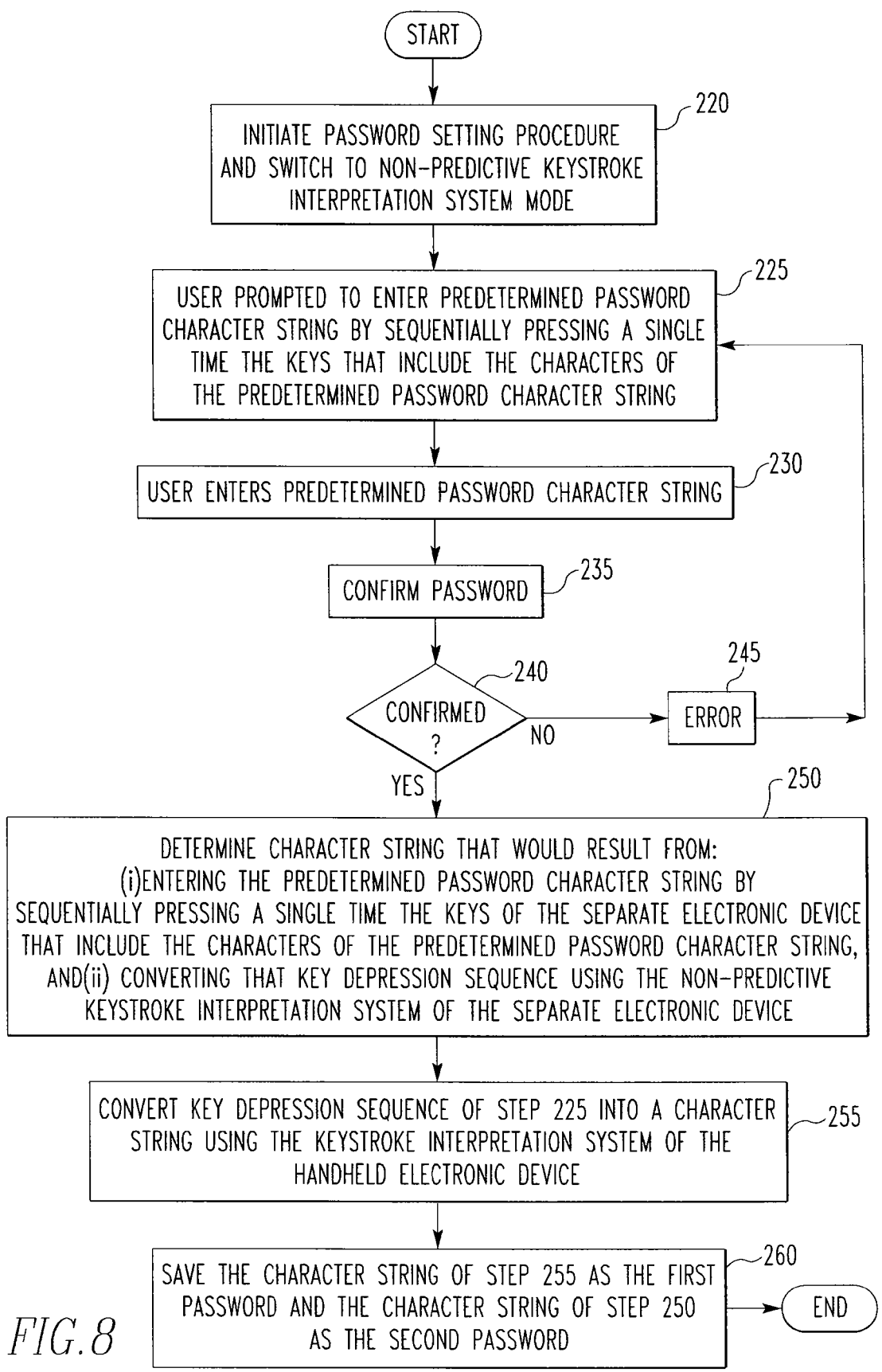

HANDHELD ELECTRONIC DEVICE HAVING REDUCED KEYBOARD AND MULTIPLE PASSWORD ACCESS, AND ASSOCIATED METHODS

CROSS-REFERENCE TO RELATED APPLICATION

This application is a divisional of U.S. patent application Ser. No. 11/063,121, entitled "Handheld Electronic Device Having Reduced Keyboard And Multiple Password Access, and Associated Methods," filed on Feb. 22, 2005 now U.S. Pat. No. 7,215,258.

BACKGROUND OF THE INVENTION

1. Field of the Invention

The invention relates generally to handheld electronic devices and, more particularly, to a handheld electronic device having a reduced keyboard and multiple stored passwords to simply the "unlocking" thereof. The invention also relates to methods of setting multiple passwords in a handheld electronic device having a reduced keyboard and of controlling access to a handheld electronic device having a reduced keyboard using multiple passwords.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keyboard by providing twelve keys, of which ten have digits thereon, and of these ten keys, eight have Roman letters assigned thereto. For instance, one of the keys includes the digit "2" as well as the letters "A", "B", and "C". Since a single actuation of such a key potentially could be intended by the user to refer to any of the letters "A", "B", and "C", and potentially could also be intended to refer to the digit "2", the input (by actuation of the key) generally is an ambiguous input and is in need of some type of disambiguation in order to be useful for text entry purposes. Other known reduced keyboards have included other arrangements of keys, letters, symbols, digits, and the like. One example of a reduced keyboard is the keypad 24 forming a part of the handheld electronic device 4 shown in FIG. 1. Keypad 24 is what is known as a reduced QWERTY keyboard.

In order to enable a user to make use of the multiple letters, digits, and the like on any given key in an ambiguous keyboard, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", if the user desires to specify the letter "C", the user will press the key three times. Similarly, on the aforementioned keypad 24, if the user desires to specify the letter "C", the user will press the key that includes "CV7" once, and if the user desires to specify the letter "I", the user will press the key that includes "UI3" two times.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed. One example of such a system is disclosed in commonly owned U.S. patent application Ser. No. 10/931,281, entitled "Handheld Electronic Device With Text Disambiguation," the disclosure of which is incorporated herein by reference.

As will be appreciated, certain of the keystroke interpretation systems described above ("multi-tap," chording, and "press-and-hold/press-and-release") rely on the number of times that a key is pressed, the number of keys that are pressed, and/or the how long that a key remains pressed, each of which constitute a non-ambiguous key depression sequence, to determine, with certainty, the intended input. Such systems do not attempt to predict an intended input from an ambiguous input like software-based text disambiguation function systems do. Such keystroke interpretation systems shall be referred to herein as "non-predictive keystroke interpretation systems" in order to distinguish them from software-based text disambiguation function keystroke interpretation systems that use software to attempt to predict intended input from an ambiguous input.

Handheld electronic devices that incorporate such a software-based text disambiguation function typically also provide a non-predictive key-based keystroke interpretation system such as the "multi-tap" system described above for use when it is not practical to use the software-based text disambiguation function. In many cases, the use of a non-predictive keystroke interpretation system such as the "multi-tap" system is the default input mode, and the software-based text disambiguation function must be selectively toggled on by the user when desired. In other cases, the software-based text disambiguation function may be automatically toggled off by the handheld electronic device in appropriate circumstances.

The problem, however, is that users of handheld electronic devices that employ a software-based text disambiguation function become accustomed to typing in that mode, wherein a key that includes the character the user wants need only be pressed a single time (even though the key has multiple characters on it). Such users often forget that, in certain situations, the software-based text disambiguation functionality is not utilized by the handheld electronic device and that in those situations they need to enter information in a different mode, such as a "multi-tap" mode or another mode utilizing a non-predictive keystroke interpretation system. Thus, users may at times press keys in a particular order (while thinking text disambiguation functionality is being employed) and expect that a certain string of characters is being input, when in fact, an entirely different string of characters is being input based on a non-predictive keystroke interpretation system employed by the handheld electronic device because, at that moment, that system, and not the text disambiguation system, is active on the handheld electronic device. For example, a user may think they are inputting the word "LITTLE" by consecutively pressing the keys, only once, that include the letters "L-I-T-T-L-E" (if the text disambiguation system were active, then it is likely that the input string "LITTLE" would result from this sequence of key pressing). However, in actuality, if the text disambiguation system is in fact not active, and instead a non-predictive keystroke interpretation system such as a multi-tap system is active, the input string that will result from consecutively pressing the keys, only once, that include the letters "L-I-T-T-L-E" will be something different than the input string "LITTLE." For example, in the case of the keypad 24 shown in FIG. 1 in a multi-tap mode, the input string "LUYLE" will result from that key depression sequence. This is the case because, referring to FIG. 1, in multi-tap mode, a single press of the key including the letter "L" will result in an "L" being input, a single press of the key including the letter "I" will result in a "U" being input, two consecutive presses of the key including the letter "T" will result in a "Y" being input, a single press of the key including the letter "L" will result in an "L" being input, and a single press of the key including the letter "E" will result in an "E" being input. For obvious reasons, this confusion may result in problems with inputting information onto such a handheld electronic device.

The problem described above is particularly acute when the establishment and input of passwords is required. As is known, most handheld electronic devices include security measures designed to ensure that only an authorized user of the handheld electronic device is able to use the handheld electronic device and access and use the data and applications provided and stored thereon. Typically, such measures are implemented by requiring that a user established password be entered into the handheld electronic device before it may be "unlocked" and used. The handheld electronic device will not move to an unlocked state until it determines that the password entered is valid and therefore accepted. As used herein, the term password refers to a string of any characters that may be input into a handheld electronic device by a user using a keyboard or the like provided as part of the handheld electronic device. In addition, many handheld electronic devices enable a user to synchronize the handheld electronic device with another electronic device, such as a personal computer, in order to synchronize data, such as addresses, calendar appointments, memos, tasks and other personal information management (PIM) data, between the two devices. As is known, this may be accomplished through a wired connection between the two devices or by wireless communications between the two devices. When a handheld electronic device is to be synchronized with another electronic device, a user must typically enter the password associated with the handheld electronic device into the other electronic device using a keyboard provided therewith, which entered password is then transmitted to the handheld electronic device for authentication. This is done to control access to the handheld electronic device to ensure that the handheld electronic device will only synchronize with an authorized electronic device.

A problem may arise, however, when a user of a handheld electronic device having a reduced keyboard as described above establishes a password for the handheld electronic device thinking the handheld electronic device is in a text disambiguation mode utilizing a software-based text disambiguation system, when in fact it is in a different input mode utilizing a non-predictive keystroke interpretation system such as a multi-tap system (most devices use a mode utilizing a non-predictive keystroke interpretation system when setting and inputting passwords). For example, a user may think they are setting their password to the string "LITTLE" by consecutively pressing the keys, only once, that include the letters "L-I-T-T-L-E" during a password setting process (because they mistakenly think the handheld electronic device is in a text disambiguation mode), when in fact, as discussed above, that key pressing sequence will be interpreted as and the password will be set to something else, for example the string "LUYLE" as described above. The user will be able to subsequently access the handheld electronic device by consecutively pressing the keys on the handheld electronic device that include the letters "L-I-T-T-L-E" when a password is required. In this case, the user again mistakenly thinks they are entering the password "LITTLE" that they set before, when in fact they are again entering "LUYLE." This does not present a problem for the user because, notwithstanding this mistake, they are still able to access the handheld electronic device. The problem arises, however, when the user tries to synchronize the handheld electronic device with another electronic device, such as a PC, that includes a standard, non-reduced keyboard. In that situation, the user will be prompted to enter the correct password into the other electronic device, and will press the keys that include the letters "L-I-T-T-L-E," thinking they are properly entering their previously established password. The handheld electronic device, however, will require the string "LUYLE" in order to permit access, as that was the string actually entered during the password establishment process. The user, having entered the string "LITTLE," will be denied access. A similar problem may arise when trying to pair handheld electronic device 4 with another electronic device, such as a PC, that includes a standard, non-reduced keyboard in order to establish a connection, for example using the Bluetooth™ protocol, between the two. As is known in the art, the term "pairing" means that the two devices have exchanged a password or the like that has been entered into each in order to establish a trusted connection.

Moreover, reduced keyboards present different difficulties when a user wants to set their handheld password to a particular string, such as a particular password that they use in multiple other places (e.g., other computer systems, online identities, etc.). Entering certain password strings in a non-predictive keystroke interpretation system mode can be difficult and time consuming, as compared to entering the same password string on a standard, non-reduced keyboard. For example, if a user wants to set his or her password to "SOCCER," that password will be relatively easy to input on a standard, non-reduced keyboard (the user simply presses the keys that includes the letters "S-O-C-C-E-R"), but relatively difficult to enter on a reduced keyboard in a non-predictive keystroke interpretation system mode. Specifically, again using the keypad 24 shown in FIG. 1 and a multi-tap input mode as an example, to actually enter the string "SOCCER" on the handheld electronic device, the user must press the key including the letter "S" twice, press the key including the letter "O" once, press the key including the letter "C" once, wait a sufficient time, again press the key including the letter "C" once, press the key including the letter "E" once, wait a sufficient time, and press the key including the letter "R" once (which is the same as the key including the letter "E").

Thus, a method is needed for handheld electronic devices having reduced keyboards and non-predictive keystroke interpretation system that simplifies the establishment and inputting of passwords both from the handheld electronic device and another separate electronic device seeking access to the handheld electronic device.

SUMMARY OF THE INVENTION

An improved handheld electronic device having a reduced keyboard and an associated method provide simplified "unlocking" thereof and access thereto as initiated from both the handheld electronic device or from a separate electronic device that is linked with the handheld electronic device, such as in a data synchronization mode.

These and other aspects of the invention are provided by a method of establishing a first password consisting of a first character string and a second password for a handheld electronic device that has a reduced keyboard, such as a reduced QWERTY keyboard, having a plurality of keys. The first password is valid and accepted when input using a non-reduced keyboard, such as a standard QWERTY keyboard, of a second electronic device, such as a PC, and the second password is valid and accepted when input using the reduced keyboard of the handheld electronic device. The handheld electronic device also has a non-predictive keystroke interpretation system, such as a multi-tap system, for converting keystrokes into character strings. The method includes entering the first character string into the handheld electronic device using a first key depression sequence, wherein the first key depression sequence results from a pressing of a first plurality of the keys of the reduced keyboard, and wherein the non-predictive keystroke interpretation system converts the first key depression sequence into the first character string. The method further includes converting the first character string into a second character string. The second character string is a character string that would result from executing a second key depression sequence on the reduced keyboard and using the non-predictive keystroke interpretation system to convert the second key depression sequence into a corresponding character string. In the method, the first character string consists of a plurality of first characters, and the second key depression sequence is one that would result from a pressing of a second plurality of the keys of the reduced keyboard based on an order of the first characters in the first character string, wherein each of the second plurality of the keys has at least one of the first characters of the first character string provided thereon. Finally, the method includes storing the first character string as the first password and the second character string as the second password, wherein the first character string and the second character string are different from one another.

In another embodiment, the invention relates to a method of establishing a first password and a plurality of second passwords for a handheld electronic device that has a reduced keyboard having a plurality of keys. The first password is valid and accepted when input using the reduced keyboard of the handheld electronic device and the second passwords are valid and accepted when input using a non-reduced keyboard of a second electronic device. The handheld electronic device also has a non-predictive keystroke interpretation system. The method includes performing a key depression sequence on the handheld electronic device, wherein the key depression sequence results from a pressing of two or more of the keys of the reduced keyboard, converting the key depression sequence into a first character string using the non-predictive keystroke interpretation system, determining all of the possible character string permutations that correspond to the key depression sequence, and storing the first character string as the first password and the character string permutations as the plurality of second passwords.

In yet another embodiment, the invention relates to a method of establishing a first password and a second password for a handheld electronic device that has a first reduced keyboard having a plurality of first keys. The first password is valid and accepted when input using the first reduced keyboard of the handheld electronic device, and the second password is valid and accepted when input using a second reduced keyboard of a second electronic device. The second reduced keyboard has a plurality of second keys. In addition, the handheld electronic device has a first non-predictive keystroke interpretation system and the second electronic device has a second non-predictive keystroke interpretation system. The method includes performing a first key depression sequence on the handheld electronic device, the first key depression sequence resulting from entering a predetermined character string having a plurality of predetermined characters in a predetermined order by pressing particular ones of the first keys of the first reduced keyboard that include the predetermined characters in the predetermined order. The method further includes converting the first key depression sequence into a first character string using the first non-predictive keystroke interpretation system. Also, the method includes determining a second character string that would result from: (i) performing a second key depression sequence on the second electronic device by entering the predetermined character string by pressing particular ones of the second keys of the second reduced keyboard that include the predetermined characters in the predetermined order, and (ii) converting the second key depression sequence using the second non-predictive keystroke interpretation system. Finally, the first character string is stored as the first password and the character string is stored as the second password.

The invention further relates to method of controlling access to a handheld electronic device having a reduced keyboard having a plurality of keys and a non-predictive keystroke interpretation system. The method includes permitting access to the handheld electronic device when a first password is input using a non-reduced keyboard of a second electronic device, and permitting access to the handheld electronic device when a second password is input using the reduced keyboard of the handheld electronic device. Moreover, the first password consists of a first character string consisting of a plurality of first characters and the second password consists of a second character string, the first character string and the second character string being different from one another. The second character string is a character string that would result from executing a key depression sequence on the reduced keyboard and using the non-predictive keystroke interpretation system to convert the key depression sequence into a corresponding character string. The key depression sequence is one that would result from a pressing of a first plurality of the keys of the reduced keyboard based on an order of the first characters in the first character string, wherein each of the first plurality of the keys has at least one of the first characters of the first character string provided thereon.

In another embodiment, the invention relates to a method of controlling access to a handheld electronic device having a reduced keyboard having a plurality of keys and a non-predictive keystroke interpretation system. The method includes permitting access to the handheld electronic device when a first password is input using the reduced keyboard of the handheld electronic device, and permitting access to the handheld electronic device when one of a plurality of second passwords is input using a non-reduced keyboard of a second electronic device. In the method, the first password consists of a first character string and the second passwords consist of a plurality of second character strings. The first character string is a character string that would result from executing a key depression sequence on the reduced keyboard and using the non-predictive keystroke interpretation system to convert the key depression sequence into a corresponding character string, and the second character strings are all of the possible character string permutations that correspond to the key depression sequence.

In yet another embodiment, the invention relates to a method of controlling access to a handheld electronic device having a first reduced keyboard having a plurality of first keys and a first non-predictive keystroke interpretation system. The method includes permitting access to the handheld electronic device when a first password is input using the first reduced keyboard of the handheld electronic device, and permitting access to said handheld electronic device when a second password is input using a second reduced keyboard of a second electronic device, the second electronic device having a second non-predictive keystroke interpretation system and a plurality of second keys. The first password consists of a first character string and the second password consists of a second character string. The first character string is a first converted character string that would result from: (i) performing a first key depression sequence on the handheld electronic device, the first key depression sequence resulting from entering a predetermined character string having a plurality of predetermined characters in a predetermined order by pressing particular ones of the first keys of the first reduced keyboard that include the predetermined characters in the predetermined order, and (ii) using the first non-predictive keystroke interpretation system to convert the first key depression sequence. The second character string is a second converted character string that would result from: (i) performing a second key depression sequence on the second electronic device by entering the predetermined character string by pressing particular ones of the second keys of the second reduced keyboard that include the predetermined characters in the predetermined order, and (ii) converting the second key depression sequence using the second non-predictive keystroke interpretation system.

Finally, the invention also relates to a handheld electronic device including a reduced keyboard having a plurality of keys, a processor, and a memory storing a plurality of routines executable by the processor. In the handheld electronic device, one or more of the routines implements a non-predictive keystroke interpretation system. Also, one or more of the routines is adapted to implement the various methods of establishing passwords for and permitting access to the handheld electronic device as described above.

BRIEF DESCRIPTION OF THE DRAWINGS

A full understanding of the invention can be gained from the following Description of the Preferred Embodiments when read in conjunction with the accompanying drawings in which:

FIG. 8 is a flowchart depicting a routine executed by the processor of the handheld electronic device of FIGS. 1 and 2 for setting passwords for the handheld electronic device of FIGS. 1 and 2 according to a third embodiment of the invention.

Similar numerals refer to similar parts throughout the specification.

DESCRIPTION OF THE PREFERRED EMBODIMENTS

Figure 1:
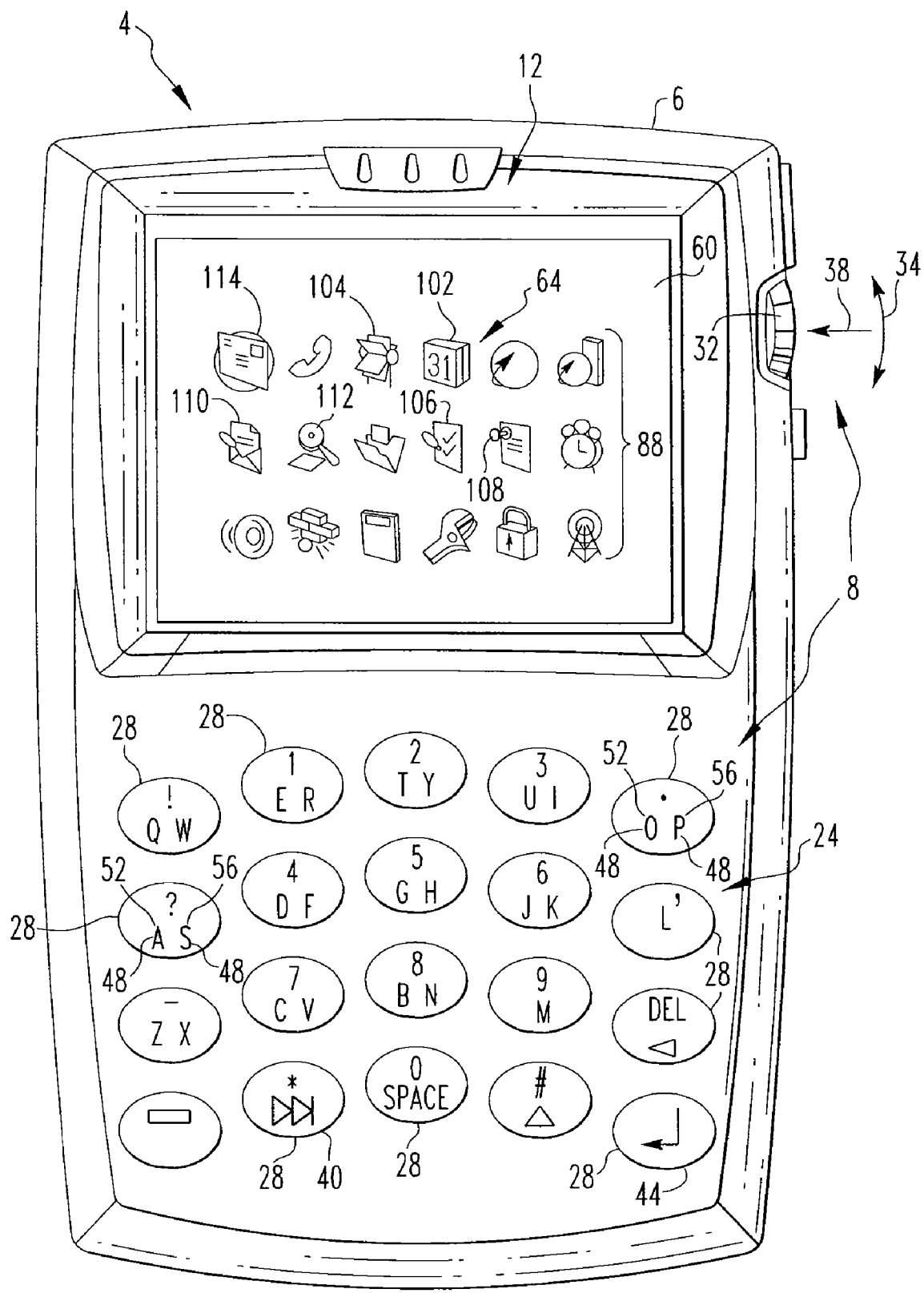
FIG. 1 is a front view of an improved handheld electronic device in accordance with the invention.
Figure 2:
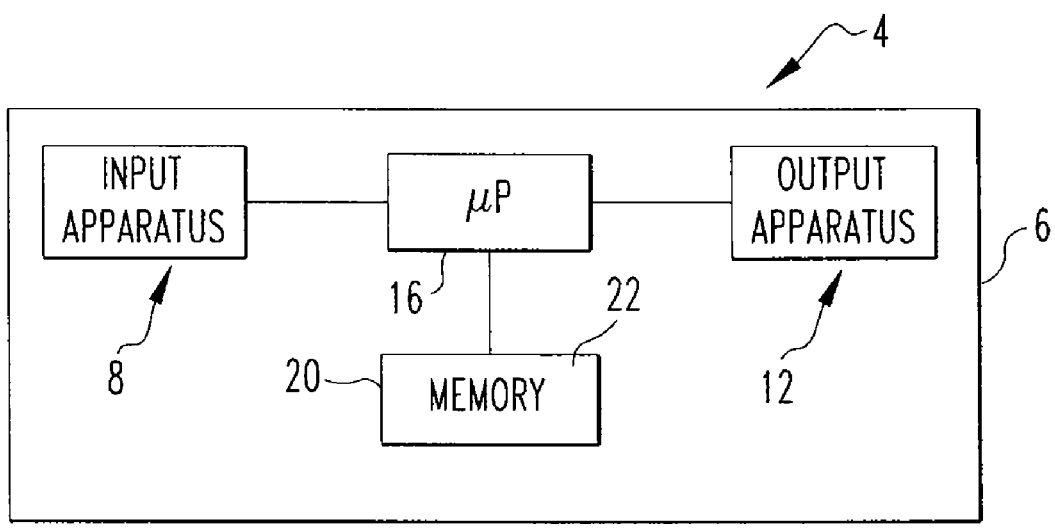
FIG. 2 is a block diagram of the handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, and a memory 20. The processor 16 may be, for instance, and without limitation, a microprocessor (µP) and is responsive to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, the disclosures of which are incorporated by reference herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other reduced configurations, such as a reduced AZERTY keyboard, a reduced QWERTZ keyboard, or other keyboard arrangement, whether presently known or unknown. In this regard, the expression "reduced" and variations thereof, in the context of a keyboard, such as a keypad or other arrangement of input members, shall refer broadly to an arrangement in which at least one of the input members has assigned thereto a plurality of characters within a given set, such as a plurality of letters, for example, in the set of Roman letters, for example, thereby rendering ambiguous an intended result of an actuation of the at least one of the input members.

In this regard, and as will be set forth below in greater detail, the system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT>key 40 and an <ENTER>key 44. The <NEXT>key 40 can be pressed to provide a selection input to the processor 16 and provides substantially the same selection input as is provided by a rotational input of the thumbwheel 32. Since the <NEXT>key 40 is provided adjacent a number of the other keys 28 of the keypad 24, the user can provide a selection input to the processor 16 substantially without moving the user's hands away from the keypad 24 during a text entry operation.

As can further be seen in FIG. 1, many of the keys 28 include a number of characters 48 disposed thereon. As employed herein, the expression "a number of" and variations thereof shall refer broadly to any quantity, including a quantity of one, and in certain circumstances herein can also refer to a quantity of zero. In the exemplary depiction of the keypad 24, many of the keys 28 include two or more characters, such as including a first character 52 and a second character 56 assigned thereto. It is understood that the expression "characters" shall broadly be construed to include letters, digits, symbols and the like and can additionally include ideographic characters, components thereof, other linguistic elements, and the like. The keys 28 having one or more characters 48 or other linguistic elements can be considered to be linguistic input members.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

Referring again to FIG. 1, the output apparatus 12 includes a display 60 upon which is provided an example output 64. The display 60 may also include a caret (e.g., cursor) (not shown) that depicts generally where the next input from the input apparatus 8 will be received. The output 64 of FIG. 1 is depicted as displaying a home screen that represents a number of applications depicted as corresponding discrete icons 88. The applications include, for example, a Calendar application, an Address Book application, a Tasks application, a MemoPad (Memos) application, a Messages application, a Global Search application, and an E-mail application. The corresponding icons 88 include, for example, the Calendar icon 102, the Address Book icon 104, the Tasks icon 106, the MemoPad icon 108, the Messages icon 110, the Global Search icon 112, and the E-mail icon 114, respectively.

In FIG. 1, the home screen output 64 is currently active and would constitute another one of the applications. One of the other applications, such as the Messages application, can be initiated from the home screen output 64 by providing a suitable input through the input apparatus 8, such as by suitably rotating the thumbwheel 32 and providing a selection input by translating the thumbwheel 32 in the direction indicated by the arrow 38. For example, the home screen output 64 displays the icon 112 associated with the Global Search application 100, and accepts input from the input apparatus 8 to launch a global search from that icon.

Although not expressly shown in FIG. 1, the icons 88 may be part of a ribbon (not shown) including a series of icons that form a device toolbar (not shown) or taskbar (not shown) on the home screen output 64.

The memory 20 is depicted schematically in FIG. 2. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. The routines 22 include a software-based text disambiguation function as described elsewhere herein as an application, as well as other routines. In addition, the routines 22 also include a non-predictive keystroke interpretation system, preferably a "multi-tap" system, that allows a user to substantially unambiguously specify a particular character 48 on a particular key 28 by pressing the same key 28 a number of times equivalent to the position of the desired character 48 on the key 28.

Figure 3:
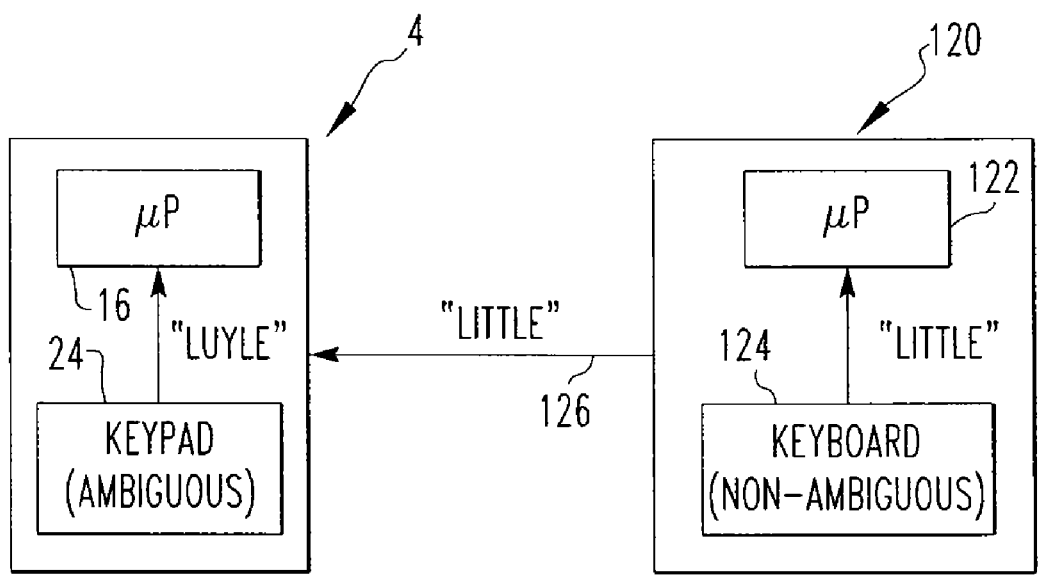
FIG. 3 is a block diagram illustrating the handheld electronic device of FIGS. 1 and 2 being linked with a separate electronic device according to a first embodiment of the invention.

According to an aspect of the invention, represented schematically in FIG. 3, handheld electronic device 4 includes a routine 22, stored in memory 20 and executable by processor 16, for setting passwords required for "unlocking" handheld electronic device 4 when handheld electronic device 4 is in a "locked," password protected state and for verifying that a separate electronic device 120, such as a PC, having processor 122 and a non-reduced keyboard 124 is authorized to be linked with handheld electronic device 4 over electronic connection 126 (which may be wired or wireless). In operation, the routine causes handheld electronic device 4 to store two passwords. The first password is to be used for purposes of verifying that the electronic device 120 is authorized to have access to and be linked with handheld electronic device 4, such as in a data synchronization mode described above, and is to be input into the non-reduced keyboard 124. Non-reduced keyboard 124 may, for example, be a standard, non-reduced QWERTY keyboard or another non-reduced keyboard described herein. The second password is to be used to "unlock" handheld electronic device 4 when the password is input into handheld electronic device 4 using the keys 28 of the keypad 24 in a mode where the software-based text disambiguation function of handheld electronic device 4 is inactive, and instead the non-predictive keystroke interpretation system, preferably a "multi-tap" system, is active. The first password will be a first character string that results from the sequential depression of a plurality of keys on the non-reduced keyboard 124 of the electronic device 120 (as will be appreciated, this sequential depression of keys will result in a non-ambiguous output). The second password will be a second character string that results from the sequential depression, in a mode where the non-predictive keystroke interpretation system, preferably a "multi-tap" system, is active, of those keys 28 on keypad 24 that have the characters 48 disposed thereon that directly correspond to the characters making up the first character string (of the first password). As will be appreciated, this sequential depression of keys 28 will result in a second character string that, as interpreted by the non-predictive keystroke interpretation system, is different from the first character string. For example, if the first character string that results from the sequential depression of the keys on the non-reduced keyboard 124 of the electronic device 120 is "LITTLE," then the second character string resulting from the sequential depression, in, in this example, a "multi-tap" mode, of those keys 28 on keypad 24 that have the characters "L-I-T-T-L-E" disposed thereon will be "LUYLE." The handheld electronic device 4, in this example, will store two passwords, "LITTLE" (to be input into the electronic device 120) and "LUYLE" (to be input into the handheld electronic device 4). Thus, with the invention, the user of handheld electronic device 4 need only "think about" a single password (and character string), that being the password that is to be input into the electronic device 120 (e.g., "LITTLE"), because when the user sequentially presses the keys 28 including the characters of that password (e.g., the "L-I-T-T-L-E" keys), the handheld electronic device 4 will accept the resulting character string (e.g., "LUYLE") as a proper password. While the term "depression" has been used herein, it should be understood to refer to any actuation of a key.

This scheme is simpler and more convenient than single password alternatives, which would require a user to either: (1) use a single password that they are comfortable with for both the electronic device 120 (they would input the characters sequentially on the non-reduced keyboard 124) and the handheld electronic device 4 (which would require a more complicated (e.g., multi-tap) sequence of keystrokes to arrive at the same character string; see the "SOCCER" example in the Background section), or (2) use a single password consisting of a character string that results from a simple sequential pressing of keys 28 on the handheld electronic device 4 in a non-predictive keystroke interpretation mode, with the same character string being entered in the electronic device 120 (e.g., "LUYLE"). As will be appreciated, in the case of the latter, it will be difficult to find a suitable character string that will be easy for the user to remember, such as an actual English language word. Also in the case of the latter, it is highly unlikely that the user will be able to utilize a common password that they are already using in different applications (e.g., other computer systems, online identities, etc.).

Figure 4:
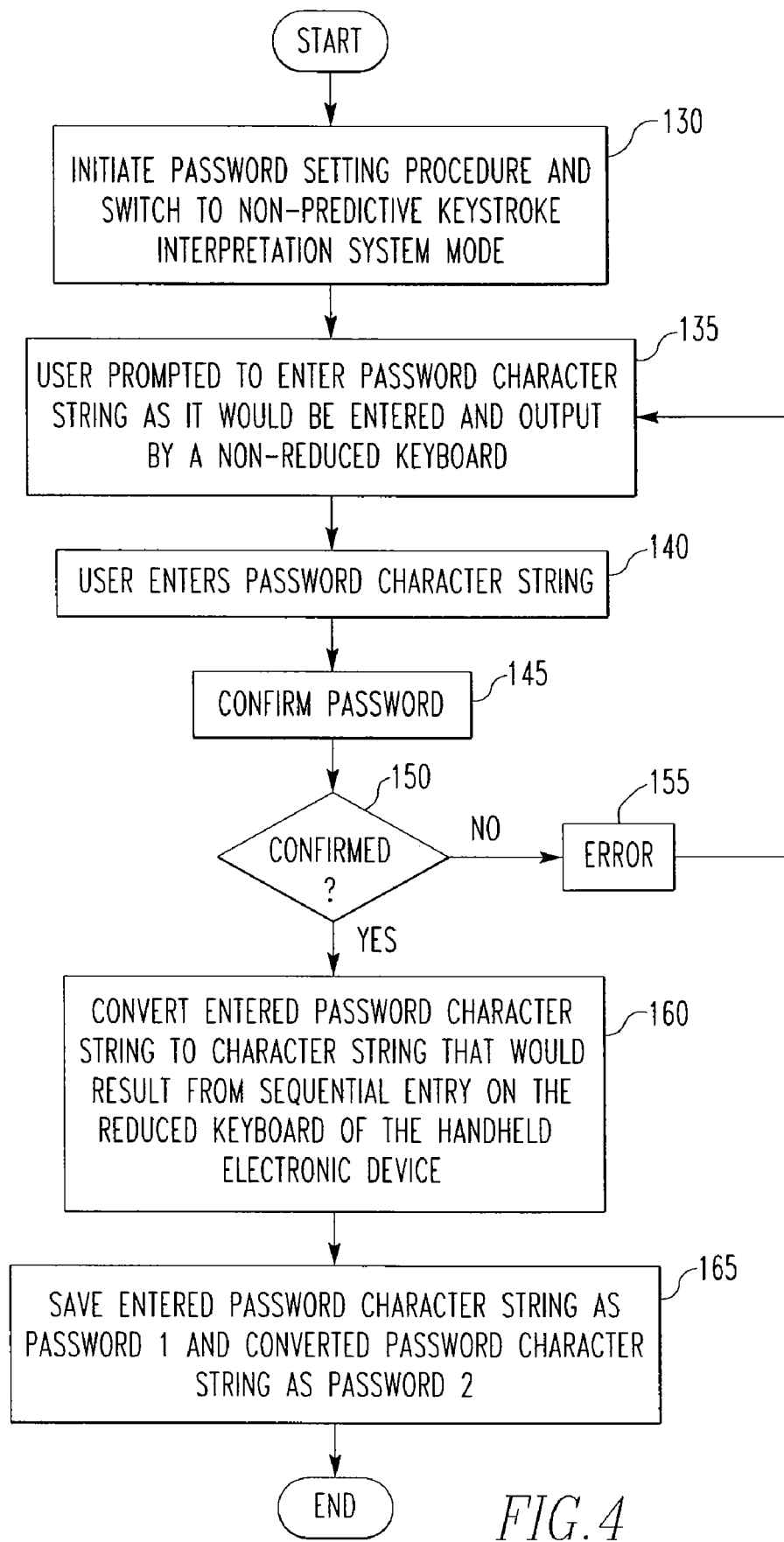
FIG. 4 is a flowchart depicting a routine executed by the processor of the handheld electronic device of FIGS. 1 and 2 for setting passwords for the handheld electronic device of FIGS. 1 and 2 according to a first embodiment of the invention.

A flowchart depicting one embodiment of a routine performed by processor 16 for setting passwords as described above is shown in FIG. 4. The routine begins at 120, where, in response to a user input, the password setting procedure is initiated and the handheld electronic device 4 switches to a mode in which the non-predictive keystroke interpretation system is active, if not already so. Next, at 135, the user is prompted to enter, using the non-predictive keystroke interpretation system (which is preferably a multi-tap system) a desired password character string as it would be entered and output using a non-reduced (non-ambiguous) keyboard. At step 140, the user enters the desired password character string. For example, if the desired password is "LITTLE," the user would press the appropriate keys 28 that would cause the non-predictive keystroke interpretation system to output the character string "LITTLE." Specifically, in the case of keypad 24 in a multi-tap mode, the user must press the key 28 including the letter "L" once, press the key 28 including the letter "I" twice, press the key 28 including the letter "T" once, wait a sufficient time, again press the key 28 including the letter "T" once, press the key 28 including the letter "L" once, and press the key 28 including the letter "E" once.

Next, at 145, the entered password character string is confirmed, by having the user re-enter it and comparing it to the previously entered password character string. At 150, a determination is made as to whether the password character string was successfully confirmed. If the answer is no, then, at 155, an error message is provided and the routine returns to 135 to restart the entering process. If, however, the answer at 150 is yes, then, at 160, the entered password character string is converted to the character string that would have resulted, in a non-predictive keystroke interpretation system mode, from the sequential pressing of the keys 28 that include the characters of the entered password character string. For example, if, as described above, "LITTLE" is the entered password character string, then the converted character password string, in the case of keypad 24 in multi-tap mode, would be "LUYLE." Then, at 165, the entered password character string is saved as password 1, which is the password to be used for purposes of verifying that the electronic device 120 is authorized to access and be linked with handheld electronic device 4, and the converted character password string is saved in memory 20 as password 2, which is the password to be used to "unlock" handheld electronic device 4 when the password is input into handheld electronic device 4 using the keys 28 of the keypad 24 in a mode where the software-based text disambiguation function of handheld electronic device 4 is inactive, and instead the non-predictive keystroke interpretation system, preferably a "multi-tap" system, is active.

Figure 5:
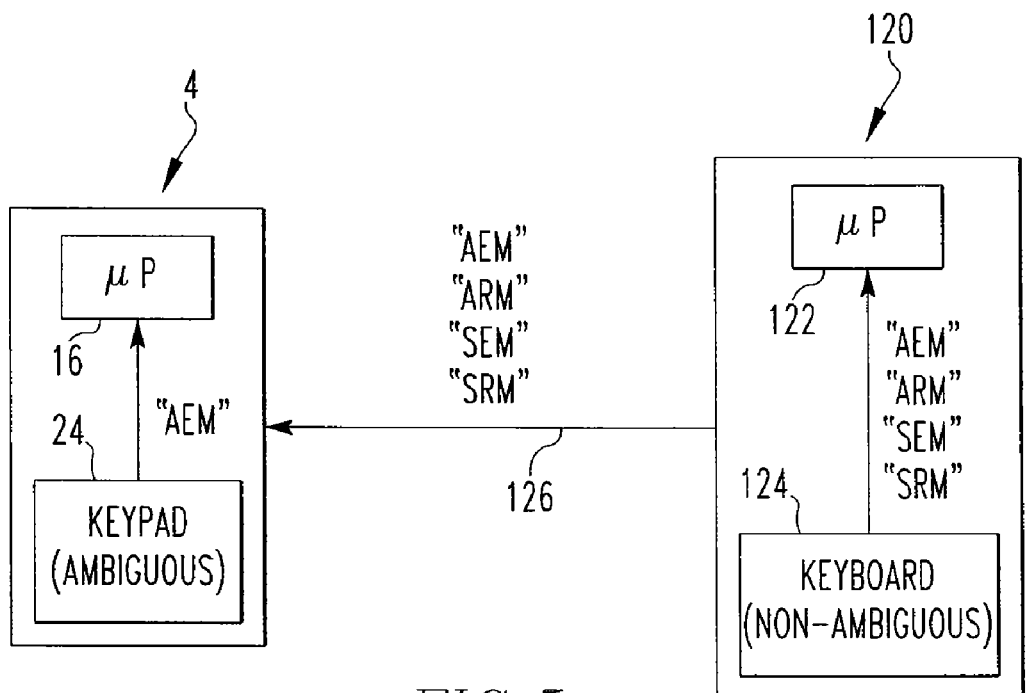
FIG. 5 is a block diagram illustrating the handheld electronic device of FIGS. 1 and 2 being linked with a separate electronic device according to a second embodiment of the invention.

According to an alternate embodiment of the invention, represented schematically in FIG. 5, handheld electronic device 4 includes an alternative routine 22 for setting passwords required for "unlocking" handheld electronic device 4 when handheld electronic device 4 is in a "locked," password protected state and for verifying that a separate electronic device 120 is authorized to be linked with handheld electronic device 4. In operation, this alternative routine 22 causes handheld electronic device 4 to store a first password and a plurality of second passwords. The first password is to be used to "unlock" handheld electronic device 4 when the password is input into handheld electronic device 4 using the keys 28 of the keypad 24 in a mode where the software-based text disambiguation function of handheld electronic device 4 is inactive, and instead the non-predictive keystroke interpretation system, preferably a "multi-tap" system, is active. The plurality of second passwords are to be used for purposes of verifying that the electronic device 120 is authorized to have access to and be linked with handheld electronic device 4, such as in a data synchronization mode described above. Any of the second passwords may be input into the non-reduced keyboard 124 for this purpose.

The first password will be a first character string that results from the sequential depression, in a mode where the non-predictive keystroke interpretation system, preferably a "multi-tap" system, is active, of the keys 28 on keypad 24 that have the characters 48 disposed thereon that directly correspond to the characters of a predetermined password character string chosen by the user. The operation of the non-predictive keystroke interpretation system is ignored by the user during this sequential depression, meaning that each key 28 is pressed only once regardless of the position of the desired character on the key 28. The second passwords will be a plurality of second character strings consisting of all of the possible permutations of the characters 48 disposed on the keys 28 that were depressed while establishing the first password. In this regard, the "permutations" refer to the various strings that can result from the characters 48 of each depressed key 28 limited by the order in which the keys 28 were depressed. For example, if the predetermined password character string chosen by the user is "ARM," then the first character string resulting from the sequential depression, in, in this example, a "multi-tap" mode, of those keys 28 on keypad 24 that have the characters "A-R-M" disposed thereon will be "AEM," and that character string will be stored as the first password. The permutations making up the plurality of second character strings will be "AEM," "ARM," "SEM," and "SRM," and those character strings will be saved a the plurality of second passwords.

Thus, with this embodiment of the invention, the user of handheld electronic device 4 need only "think about" a single password (and character string), that being the predetermined password character string chosen by the user (e.g., "ARM"), because when the user sequentially presses the keys 28 including the characters of that password (e.g., the ""A-R-M"" keys), the handheld electronic device 4 will accept the resulting character string (e.g., "AEM") as a proper password. In addition, not knowing the predetermined password character string chosen by the user, handheld electronic device 4 has stored all of the possible character strings that could be the predetermined password character string chosen by the user by storing the permutations described above as the second password. If any of those possible character strings is entered using a non-reduced keyboard, such as keyboard 124, it will be accepted as a proper password.

Figure 6:
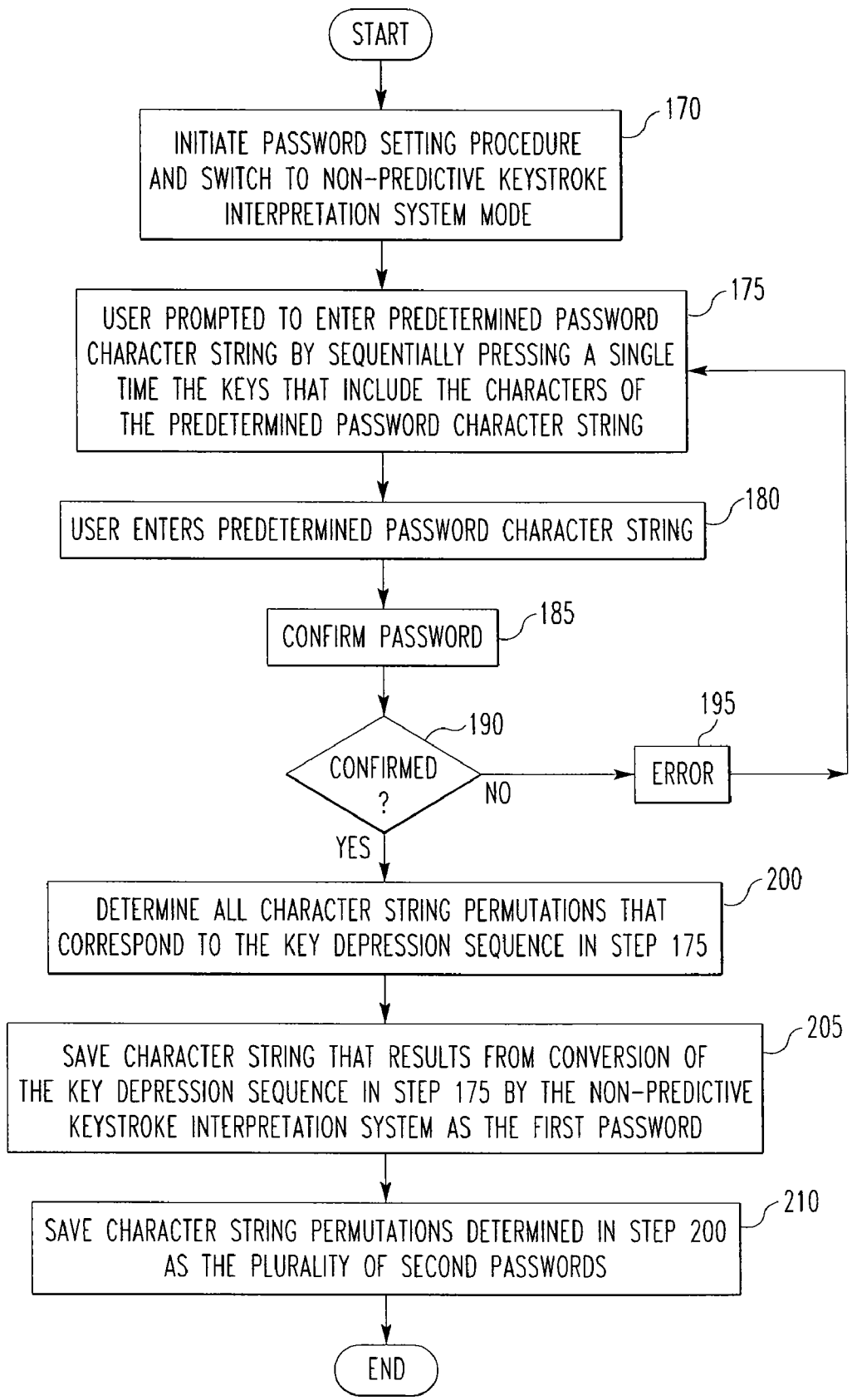
FIG. 6 is a flowchart depicting a routine executed by the processor of the handheld electronic device of FIGS. 1 and 2 for setting passwords for the handheld electronic device of FIGS. 1 and 2 according to a second embodiment of the invention.

A flowchart depicting one embodiment of the alternative routine described above is shown in FIG. 6. The routine begins at 170, where, in response to a user input, the password setting procedure is initiated and the handheld electronic device 4 switches to a mode in which the non-predictive keystroke interpretation system is active, if not already so. Next, at 175, the user is prompted to enter, while ignoring the non-predictive keystroke interpretation system, a predetermined password character string by sequentially depressing, a single time, the keys 28 having the corresponding characters provided thereon. At step 180, the user enters the predetermined password character string in this manner. For example, if the predetermined password character string is "ARM," the user would press the appropriate keys 28 that have the letter "A-R-M" disposed thereon.

Next, at 185, the entered predetermined password character string is confirmed, by having the user re-enter it and comparing it to the previously entered predetermined password character string. At 190, a determination is made as to whether the predetermined password character string was successfully confirmed. If the answer is no, then, at 195, an error message is provided and the routine returns to 175 to restart the entering process. If, however, the answer at 190 is yes, then, at 200, all of the possible permutations of the characters 48 disposed on the keys 28 that were depressed in step 175 are determined. For example, if, as described above, "ARM" is the entered predetermined password character string, then the permutations would be "AFM," "ARM," "SEM," and "SRM." Then, at 205, a first character string that would result from the conversion of the key depression sequence entered in step 175 by the non-predictive keystroke interpretation system, preferably a "multi-tap" system, is saved in memory 20 as the first password, which is the password to be used to "unlock" handheld electronic device 4 when the password is input into handheld electronic device 4 using the keys 28 of the keypad 24 in a mode where the software-based text disambiguation function of handheld electronic device 4 is inactive, and instead the non-predictive keystroke interpretation system, preferably a "multi-tap" system, is active. For example, if, as described above, "ARM" is the entered predetermined password character string, then the converted character password string, in the case of keypad 24 in multi-tap mode, would be "AEM." Then, at 210, the permutations determined in step 200 are saved as the plurality of second passwords, which are the passwords that may be used for purposes of verifying that the electronic device 120 is authorized to access and be linked with handheld electronic device 4.

Figure 7:
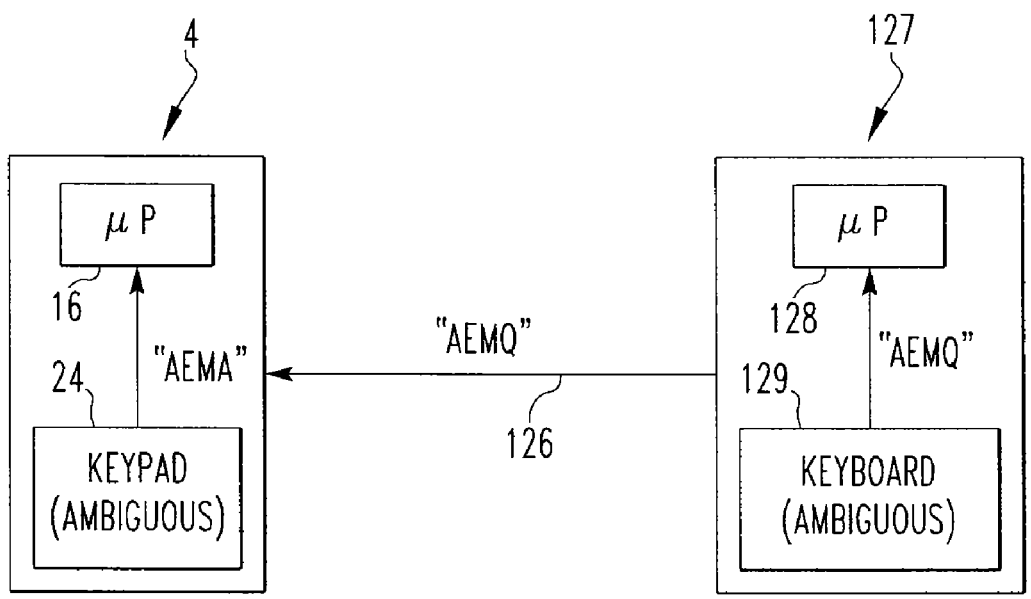
FIG. 7 is a block diagram illustrating the handheld electronic device of FIGS. 1 and 2 being linked with a separate electronic device according to a third embodiment of the invention.
Figure 9:
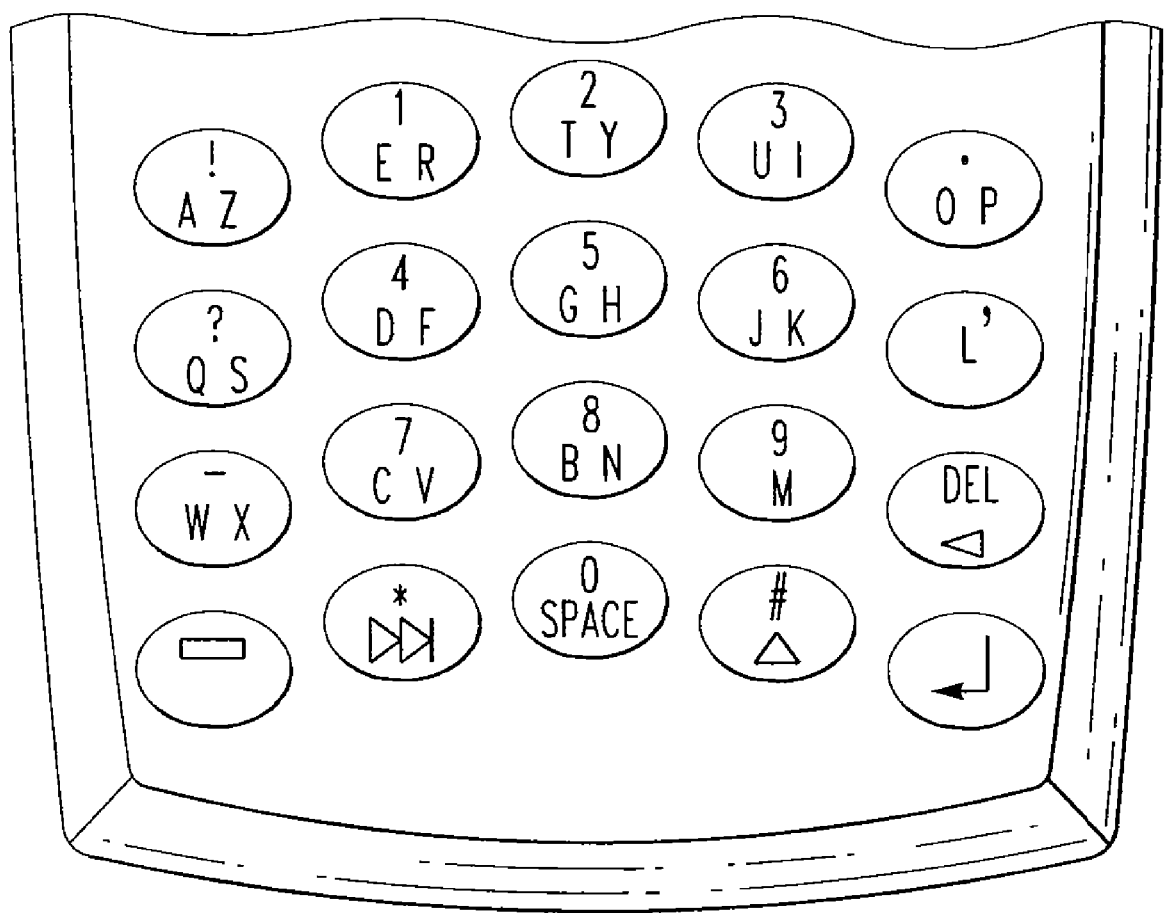
FIG. 9 is a schematic diagram of a reduced AZERTY keyboard that may be utilized in connection with the invention.

According to another alternate embodiment of the invention, represented schematically in FIG. 7, handheld electronic device 4 includes another alternative routine 22 for setting passwords required for "unlocking" handheld electronic device 4 when handheld electronic device 4 is in a "locked," password protected state and for verifying that a separate electronic device 127 having a processor 128 and a reduced keyboard 129 is authorized to be linked with handheld electronic device 4. Reduced keyboard 129 may be a reduced QWERTY keyboard as shown in FIG. 1, or another type of reduced keyboard such as, without limitation, a reduced AZERTY keyboard as shown in FIG. 9. In addition, separate electronic device 127 includes a non-predictive keystroke interpretation system and, optionally, a software-based text disambiguation function as described herein. Separate electronic device 127 may be, for example, and without limitation, another handheld electronic device or a device like a PC.

In operation, this alternative routine 22 causes handheld electronic device 4 to store a first password and a second password. The first password is to be used to "unlock" handheld electronic device 4 when the password is input into handheld electronic device 4 using the keys 28 of the keypad 24 in a mode where the software-based text disambiguation function of handheld electronic device 4 is inactive, and instead the non-predictive keystroke interpretation system, preferably a "multi-tap" system, is active. The second password is to be used for purposes of verifying that the electronic device 127 is authorized to have access to and be linked with handheld electronic device 4, such as in a data synchronization mode described above, and will be entered when the electronic device 127 is in a mode utilizing its non-predictive keystroke interpretation system.

The first password will be a first character string that results from the sequential depression, in a mode where the non-predictive keystroke interpretation system, preferably a "multi-tap" system, is active, of the keys 28 on keypad 24 that have the characters 48 disposed thereon that directly correspond to the characters of a predetermined password character string chosen by the user. The operation of the non-predictive keystroke interpretation system is ignored by the user during this sequential depression, meaning that each key 28 is pressed only once regardless of the position of the desired character on the key 28. Similarly, the second password will be a second character string that results from the sequential depression, in a mode where the non-predictive keystroke interpretation system, preferably a "multi-tap" system, is active, of the keys on keyboard 129 that have characters disposed thereon that directly correspond to the characters of the predetermined password character string. Again, the operation of the non-predictive keystroke interpretation system of electronic device 127 is ignored during this sequential depression. For example, if the predetermined password character string chosen by the user is "ARMS," then the first character string resulting from the sequential depression, in, in this example, a "multi-tap" mode, of those keys 28 on keypad 24 that have the characters "A-R-M-S" disposed thereon will be "AEMA," and that character string will be stored as the first password. In addition, assuming for purposes of this example that keyboard 129 is a reduced AZERTY keyboard, the second character string resulting from the sequential depression, in, in this example, a "multi-tap" mode, of the keys of keyboard 129 that have the characters "A-R-M-S" disposed thereon will be "AEMQ," and that character string will be stored as the second password.

A flowchart depicting one embodiment of the further alternative routine described above is shown in FIG. 8. The routine begins at 220, where, in response to a user input, the password setting procedure is initiated and the handheld electronic device 4 switches to a mode in which the non-predictive keystroke interpretation system is active, if not already so. Next, at 225, the user is prompted to enter, while ignoring the non-predictive keystroke interpretation system, a predetermined password character string by sequentially depressing, a single time, the keys 28 having the corresponding characters provided thereon. At step 230, the user enters the predetermined password character string in this manner. For example, if the predetermined password character string is "ARMS," the user would press the appropriate keys 28 that have the letter "A-R-M-S" disposed thereon.

Next, at 235, the entered predetermined password character string is confirmed, by having the user re-enter it and comparing it to the previously entered predetermined password character string. At 240, a determination is made as to whether the predetermined password character string was successfully confirmed. If the answer is no, then, at 245, an error message is provided and the routine returns to 225 to restart the entering process. If, however, the answer at 240 is yes, then, at 250, a character string that would result from: (i) entering the predetermined character string by pressing the keys of keyboard 129 that include the predetermined characters in the predetermined order, and (ii) converting that key depression sequence into a character string using non-predictive keystroke interpretation system of electronic device 127. For example, if, as described above, "ARMS" is the entered predetermined password character string, then the character string that would result from the step at 250 would be "AEMQ." Then, at 255, the key depression sequence entered in the step at 225 is converted into a character string by the non-predictive keystroke interpretation system of handheld electronic device 4. For example, if, as described above, "ARMS" is the entered predetermined password character string, then the character string generated at 255 would be "AEMA." Next, at 260, the character string generated at 250 is saved in memory 20 as the first password, which is the password to be used to "unlock" handheld electronic device 4 when the password is input into handheld electronic device 4 using the keys 28 of the keypad 24, and the character string generated at 250 is saved as the second password, which is the password that may be entered with keyboard 129 and used for purposes of verifying that the electronic device 120 is authorized to access and be linked with handheld electronic device 4.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of establishing a first password and a second password for use by a handheld electronic device and a second electronic device for gaining access to the handheld electronic device, said handheld electronic device having a first reduced keyboard with a plurality of first keys for entering characters ambiguously; said second electronic device having a second reduced keyboard with a plurality of second keys for entering characters ambiguously wherein said handheld electronic device has a first non-predictive keystroke interpretation system and said second electronic device has a second non-predictive keystroke interpretation system, the method comprising:

performing a first key depression sequence on the handheld electronic device, said first depression sequence entering a predetermined character string ambiguously based on the characters assigned to the keys of the first reduced keyboard;

converting the first key depression sequence into a first password character string using the first non-predictive keystroke interpretation system;

determining a second password character string that would result from: (i) performing a second key depression sequence on the second reduced keyboard of the second electronic device by entering the predetermined character string on the second reduced keyboard ambiguously, and (ii) converting the second key depression sequence using the second non-predictive keystroke interpretation system to form the second password character string; and storing the first password character string as said first password and the second password character string as said second password on the handheld electronic device.

2. The method according to claim 1, wherein said first reduced keyboard and said second reduced keyboard are different types of reduced keyboards.

3. The method according to claim 2, wherein said first reduced keyboard comprises a reduced QWERTY keyboard.

4. The method according to claim 1, wherein said first and second non-predictive keystroke interpretation systems each comprise a multi-tap system.

5. A method of controlling access to a handheld electronic device having a first reduced keyboard having a plurality of first keys and a first non-predictive keystroke interpretation system, including access to said handheld electronic device from a second electronic device having a second reduced keyboard having a plurality of second keys and a second non-predictive keystroke interpretation system, the method comprising:

permitting access to the handheld electronic device when a first password string is entered using the first reduced keyboard; and permitting access to the handheld electronic device when a second password string is received from said second electronic device; wherein the first password string results from: (i) performing a first key depression sequence to enter a predetermined character string on the first reduced keyboard in an ambiguous manner and (ii) converting the first key depression sequence using the first non-predictive keystroke interpretation system to form the first password string; and wherein the second password string results from determining an equivalent string that would result from: (i) performing a second key depression sequence to enter the predetermined character string using the second reduced keyboard in an ambiguous manner and (ii) converting the second key depression sequence using the second non-predictive keystroke interpretation system to form the second password string.

6. The method according to claim 5, wherein said first reduced keyboard and said second reduced keyboard are different types of reduced keyboards.

7. The method according to claim 6, wherein said first reduced keyboard comprises a reduced QWERTY keyboard.

8. The method according to claim 5, wherein said first and second non-predictive keystroke interpretation systems each comprise a multi-tap system.

9. A handheld electronic device, comprising:
a first reduced keyboard having a plurality of first keys;
a processor; and
a memory storing a plurality of routines executable by the processor, a first password and a second password, wherein one or more of the routines implements a first non-predictive keystroke interpretation system, wherein the first password is valid and accepted when input using the first reduced keyboard and the second password is valid and accepted when received from a second electronic device having a second reduced keyboard having a plurality of second keys and a second non-predictive keystroke interpretation system, and wherein another one or more of the routines is adapted to:
receive a first key depression sequence corresponding to a predetermined character string entered ambiguously using the first reduced keyboard, convert the first key depression sequence into a first password string using the first non-predictive keystroke interpretation system, and determine a second password string that would result from: (i) performing a second key depression sequence on the second reduced keyboard of the second electronic device by entering the predetermined character string on the second reduced keyboard ambiguously, and (ii) converting the second key depression sequence using the second non-predictive keystroke interpretation system to form the second password string; and
storing the first password string as the first password and the second password string as the second password.

10. The handheld electronic device according to claim 9, wherein said first reduced keyboard and said second reduced keyboard are different types of reduced keyboards.

11. The handheld electronic device according to claim 10, wherein said first reduced keyboard comprises a reduced QWERTY keyboard.

12. The handheld electronic device according to claim 9, wherein said first and second non-predictive keystroke interpretation systems each comprise a multi-tap system.

13. A handheld electronic device, comprising:
a first reduced keyboard having a plurality of first keys;
a processor; and
a memory storing a plurality of routines executable by the processor, a first password string and a second password string, wherein one or more of the routines implements a first non-predictive keystroke interpretation system, wherein another one or more of the routines is adapted to:
permit access to the handheld electronic device when the first password string is input using the first reduced keyboard and the first non-predictive keystroke system and permit access to the handheld electronic device when the second password string is received from a second electronic device having a second reduced keyboard having a plurality of second keys and a second non-predictive keystroke interpretation system;
wherein the first password string results from: (i) performing a first key depression sequence to enter a predetermined character string on the first reduced keyboard in an ambiguous manner, and (ii) converting the first key depression sequence using the first non-predictive keystroke interpretation system to form the first password string, and wherein the second password string results from determining an equivalent string that would result from: (i) performing a second key depression sequence on the second reduced keyboard of the second electronic device by entering the predetermined character string on the second reduced keyboard ambiguously, and (ii) converting the second key depression sequence using the non-predictive keystroke interpretation system to form the second password string.

14. The handheld electronic device according to claim 13, wherein said first reduced keyboard and said second reduced keyboard are different types of reduced keyboards.

15. The handheld electronic device according to claim 14, wherein said first reduced keyboard comprises a reduced QWERTY keyboard.

16. The handheld electronic device according to claim 13, wherein said first and second non-predictive keystroke interpretation systems each comprise a multi-tap system.

* * * * *

UNITED STATES PATENT AND TRADEMARK OFFICE
CERTIFICATE OF CORRECTION

PATENT NO. : 7,432,831 B2 Page 1 of 1
APPLICATION NO. : 11/736385
DATED : October 7, 2008
INVENTOR(S) : Christopher R. Wormald It is certified that error appears in the above-identified patent and that said Letters Patent is hereby corrected as shown below:

Column 1, line 21, "to simply the" should be --to simplify the--.
Column 2, line 40, "the how long" should be --how long--.
Column 4, line 61, "keys that includes" should be --keys that include--.
Column 11, line 11, "depression, in, in this example," should be --depression, is, in this example,--.
Column 13, line 4, "depression, in, in this example," should be --depression, is, in this example,--.
Column 13, line 10, "will be saved a the" should be --will be saved as the--.
Column 13, lines 17-18, "(e.g., the ""A-R-M"" keys)," should be --(e.g., the "A-R-M" keys),--.
Column 13, line 55, ""AFM,"" should be --"AEM,"--.
Column 14, line 62, "depression, in, in this example," should be --depression, is, in this example,".
Column 15, line 2, "depression, in, in this example," should be --depression, is, in this example,".

Signed and Sealed this

Tenth Day of March, 2009

JOHN DOLL
*Acting Director of the United States Patent and Trademark Office*